Patented Jan. 20, 1948

2,434,789

UNITED STATES PATENT OFFICE 2,434,789

FRACTIONATION OF MARINE OILS

Loran O. Buxton, Newark, N. J., assignor to Nopco Chemical Company, Harrison, N. J., a corporation of New Jersey No Drawing. Application April 3, 1944,
Serial No. 529,419

3 Claims. (Cl. 167—81)

The present invention relates to the production of vitamin concentrates. More particularly, the present invention relates to the fractionation of vitamin-containing marine oils in order to produce an extract or fraction containing most of the vitamin A alcohols and a residue which contains the greater proportion of the vitamin A esters.

In the fractionation of marine oils containing vitamins, a considerable loss has heretofore occurred during fractionation. This loss has occurred not only in the fractionation of refined marine oils which, as is well known, are subject to oxidation, but also in the fractionation of crude marine oils which contain substantial quantities of natural antioxidants and are known to be relatively stable.

It has now been discovered that if a small quantity of an antioxidant is added to marine oils prior to fractionation, the yields of vitamin alcohol and vitamin ester are greatly enhanced. Furthermore, it is possible to produce a vitamin A alcohol extract from a carbon-refined fish liver oil which is relatively stable and also free from objectionable fishy-type odor and taste. It is to be noted in this connection that carbon-refined fish liver oil is substantially free from natural antioxidant and is therefore highly unstable. When vitamin-containing marine oils are fractionated with relatively polar solvents, the extract portion not only contains substantially all of the vitamin A alcohols of the original oil, but also contains in a concentrated form, the taste and odor constituents. These taste and odor constituents, due to their concentration and polar similarity to the vitamin A alcohol components, are very difficult to remove from the vitamin A alcohol concentrate thus produced. Although attempts have been made previously to extract carbon-refined fish liver oils and the like by fractionation with a polar solvent, a very great loss is encountered due to oxidation during the fractionation.

In accordance with the present invention, however, prior to fractionation, the refined fish liver oil is mixed with a relatively small amount of antioxidant. Preferably, the antioxidant used in the present invention is one produced in accordance with copending applications, Serial Nos. 397,547, now Pat. No. 2,345,578, dated Apr. 4, 1944, and 351,909, now Pat. No. 2,345,576, dated Apr. 4, 1944, i. e. antioxidant concentrates produced by solvent extraction of antioxidant-containing vegetable oils or solids. Antioxidants of this type are soluble in marine oils and to some extent in polar solvent extracts thereof, so that a portion of the antioxidant during fractionation will be found in both the extracted fraction and in the residue. The vitamin A alcohol concentrate thus produced is relatively stable, and all of the fractions and residues during successive fractionations are stabilized by an antioxidant concentrate of this type.

It is one of the objects of the present invention, therefore, to fractionate a vitamin-containing marine oil with a polar solvent of the character of ethanol or methanol in the presence of a suitable antioxidant.

A second object of the present invention is to separate the vitamin A alcohols from the vitamin A esters of a marine oil containing the same, at the same time preventing any substantial loss of vitamin content.

A third object of the present invention is to prepare in an economical manner a vitamin A alcohol extract of a refined marine oil which is substantially free from taste and odor.

Other objects and advantages of the present invention will become apparent from the subsequent description and claims.

As before stated, the present process includes the treatment of various types of marine oils and marine oil concentrates to separate the vitamin A alcohols from the vitamin A esters. Among the materials which may be treated are fish oils, such as cod liver oil, tuna liver oil, shark liver oil, halibut liver oil, and fish oils from sardine, menhaden, herring and the like. These oils may be previously concentrated in accordance with well known methods, as for example, partial saponification and separation of saponified fatty acids, or they may be crude oils. Preferably, when it is desired to produce a vitamin A alcohol concentrate free from taste and odor, the marine oil is first treated with activated carbon or other taste and odor removing material.

To such a marine oil, there is added a relatively small amount, as for example from about 0.5 to 30%, and preferably from about 1% to 5%, of an antioxidant concentrate produced by solvent extraction of antioxidant-containing materials. Such concentrates may be obtained not only by extracting vegetable oils, but oil-bearing solids. The vegetable oil or oil-bearing solids may be any oil-bearing solid or oil containing naturally occurring antioxidants. The oil-bearing solid may contain all the oil, fat or wax present in said solid in its natural state, or it may have had a substantial proportion of the fatty material or oil removed. Thus, vegetable materials such as soybean meal or cake, wheat bran, wheat germ, corn germ, corn, grain, oats, rye, olives, sesame seed, cottonseed, cocoa bean, palm kernels, copra, rice, rice germ, flax seed, teaseed, hemp seed, perilla seed, alfalfa seed, etc. may be used as a type of material from which antioxidant concentrates are extracted. In some instances, antioxidant concentrates may be extracted from fish livers themselves or from fish oils. Various vegetable seeds such as tomato seeds, and animal materials such as egg yolks may also serve as the basic materials from which such antioxidant concentrates are prepared. Vegetable oils and fats such as soybean oil, wheat germ oil, cottonseed oil, palm oil, etc. are also suitable.

As pointed out in U. S. Patents Nos. 2,345,576 and 2,345,578, these antioxidants are recovered from fatty materials with which they are associated by extraction with a suitable solvent. The solvent employed in accordance with the aforementioned applications is aliphatic in character and a member of well recognized chemical classes. Further, the number of carbon atoms in the solvent used is an important factor in determining the availability thereof for use in extracting antioxidants.

The following table sets forth the classes of solvents particularly useful in the production of antioxidant concentrates.

*Table*

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

Solvents falling within the classes above listed are all liquid aliphatic organic compounds having the properties of being substantially miscible with fatty materials at temperatures above room temperature, i. e. 20° to 25° C., and partially immiscible therewith at temperatures substantially below room temperature, and experiments have shown that solvents falling within this class of compounds are particularly desirable.

Some of the solvents of the character above described are as follows: n-propyl alcohol, isopropyl alcohol, n-butyl alcohol, n-amyl alcohol, isoamyl alcohol, secondary amyl alcohol, furfuryl alcohol, allyl alcohol, diacetone alcohol, beta-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural propionaldehyde, crotonaldehyde, acetone, methyl ethyl ketone, acetonyl acetone and propylene chlorhydrin. Mixtures of these solvents belong to that class of aliphatic organic compounds which have the properties of being miscible with fatty oils at temperatures above room temperature and partially immiscible therewith at temperatures substantially below room temperature; furthermore, it will be noted that the majority of these solvents have relatively low freezing points.

Occasionally, it may be found that certain of the solvents hereinabove mentioned may be too miscible with some of the fatty materials which may be treated to effect a separation of antioxidants therefrom; thus, for example, acetone is too miscible with many fatty materials. However, this condition may be easily corrected by diluting the solvent either with a small amount of water or with some liquid aliphatic organic solvent relatively immiscible with fatty materials. In general, it may be said that the effect of diluting any of the above solvents with water will be to render the solvent more immiscible with fatty materials, so that if difficulty is encountered in effecting proper separation of the antioxidant extracts from the fatty material, this difficulty may generally be overcome by the addition of a small amount of water to the solvent.

The solvents preferably employed for the production of the antioxidant concentrates are the aliphatic alcohols containing from 3 to 6 carbon atoms. Of these solvents, isopropanol and diacetone alcohol have proved to be the most successful. The presence of the hydroxyl group seems to impart to these solvents, properties which make them particularly useful.

In carrying out the extraction of the antioxidants from the oils and oil-bearing solids with which they are associated, the material to be treated is first mixed with the particular solvent to be employed. The relative proportion of material to solvent may vary widely; preferably, the ratio of solvent to material should be greater than one, and in most cases, mixtures containing between about 2% and about 25% oil are most suitable. Where oil is being treated, it is preferable to cause substantially all the oil to dissolve in the solvent; when employing the preferred solvents complete solution is ordinarily effected most readily by heating the mixture to a temperature substantially above room temperature. However, it is not necessary to cause the oil to dissolve completely in the solvent since highly active antioxidant fractions may be extracted from the oil and oil-bearing solids by agitating the oil or solid with the solvent at a temperature such that only partial solution is effected. The extraction is preferably carried out in an inert gas atmosphere; furthermore, if fat-soluble vitamins are present in the oil being extracted, it is not advisable to heat the mixture to temperatures substantially in excess of 175° C. if recovery of the vitamins is desired.

The antioxidant fraction extracted from the oil may be recovered in any suitable manner. When the oil is completely dissolved in the solvent at somewhat elevated temperatures, the recovery of the antioxidant extract is most conveniently accomplished by cooling the solution to a temperature substantially below room temperature, e. g. between about 0° C. and about —70° C., whereby two layers form.

The solvent layer obtained from the extraction above described may be filtered and then treated to remove the solvent therefrom, e. g. by vacuum distillation, whereby an extract is recovered containing relatively large amounts of highly active antioxidants. If desired, water may be added to the extract in order to precipitate some of the glycerides contained therein or some of the sterols may be removed; however, these steps are not essential, since the glycerides and sterols do not inhibit the antioxidant properties of the extract. If the extract contains an excessive amount of free fatty acids, these are preferably removed by treatment with alkali in a solvent medium or by other suitable methods. The extract ordinarily possesses the characteristic odor and color of the oil from which it is obtained and is generally slightly more viscous than the original oil.

Although it is preferred to use antioxidant concentrates extracted from various fatty materials as above set forth and more completely described and claimed in U. S. Patents Nos. 2,345,576 and 2,345,578; the present process may be carried out by using other types of antioxidant concentrates than those obtained by solvent extraction of antioxidant-containing vegetable oils or solids. However, it is preferred to use antioxidant concentrates which are extracted in accordance with the methods of the aforementioned patents by means of isopropanol from various vegetable oils and oil-bearing solids such as corn oil, soybean oil, etc.

In addition to the aforementioned specific antioxidant concentrates and the conventional antioxidants, ammonia-treated antioxidant concentrates may also be employed in the practice of the present invention. Such concentrates are described in copending application, Serial No. 528,353, filed March 27, 1944. After the antioxidant has been added to the marine oil, the antioxidant-containing oil is mixed with a suitable quantity of a polar solvent. As previously set forth, the polar solvent is preferably a lower alcohol such as methanol or ethanol. However, any other solvent which is characterized by being miscible (a solvent for) with vitamin alcohols but immiscible (a non-solvent for) with vitamin esters may be employed in lieu of, or in combination with, the methanol or ethanol. Such solvents may include, among others, isopropanol, isobutanol, normal butanol, acetone, and diacetone alcohol, each of which has been modified by the addition of at least 9% water, methanol and/or ethanol. It is to be noted that the addition of the water imparts to these solvents sufficiently polar characteristics to dissolve the vitamin A alcohol at relatively low temperatures while, at the same time, the vitamin A ester at the selected temperature is immiscible therewith.

After the solvent has been added and thoroughly mixed, the mixture of marine oil and solvent is allowed to stand, preferably from about 4 to 12 hours, i. e. a time sufficient to form two layers and allow the solvent layer to clear. The supernatant solvent extract is then decanted, and the residual oil layer may be once again treated with a similar volume of solvent. The extracts may then be combined, and the solvent distilled therefrom, preferably under reduced pressure. In all instances it is desirable, though not essential, to conduct a current of nitrogen gas into the vessel in which the solvent and marine oil is being mixed.

Although in general it is unnecessary to heat the mixtures of marine oil and solvent, in some instances where complete extraction is desired, it may be desirable to heat the solvent and marine oil together for a substantial period. In general, the temperature should not be too high or a loss of solvent and of vitamin content may occur. Temperatures of the order of 50° C. are suitable. With certain solvents, it is necessary to reflux the mixture of solvent and marine oil together in order to achieve temperatures of this order. Thereafter, in order to promote layer formation, the mixture may be cooled, if it has been heated, to room temperature or lower. With certain solvents, in order to obtain a sharp fractionation, temperatures below 0° C. are desirable. In general, the quantities of solvent used substantially exceed the quantity of marine oil, and it may be stated that it is desirable to utilize from at least 4 to 50 parts of solvent per part of oil. Instead of adding the antioxidant to the marine oil itself, the antioxidant may be dissolved in the solvent. In general, however, better results will be obtained if the antioxidant is dissolved in the oil prior to the solvent fractionation operation.

It is to be noted that when an antioxidant is added to the marine oil prior to the fractionation, the yields of vitamin A alcohol in the extract and the vitamin A ester in the residue are greatly increased.

The following examples serve to illustrate the process of the present invention, although the invention is not limited to the specific materials or conditions therein set forth.

Example I

Three hundred grams of crude shark liver oil containing 37,500 units of vitamin A per gram were mixed with 1200 ml. of methanol in the presence of an atmosphere of nitrogen gas and the mixture heated to 50° C. After thorough mixing, the said mixture was cooled to −26° C. After 12 hours at the low temperature, the supernatant methanol extract was decanted and the residual oil layer treated three more times with similar volume portions of methanol in exactly the same manner. The four combined methanol extract fractions, as well as the residual methanol insoluble layer, were freed of methanol by distillation in the presence of nitrogen under reduced pressure. 10.4 grams of extract were obtained having a vitamin A value of 78,600 units of vitamin A per gram. The residue weighed 286.3 grams and the vitamin value thereof was 29,500 vitamin A units per gram. The total oil yield was therefore 99.1%, and the total vitamin A yield in the extracts and residue approximately 82%.

Example II

The experiment of Example I was repeated, except that 5% of soybean oil extract antioxidant was added to the crude shark liver oil. The soybean oil antioxidant concentrate was obtained by extracting 66.5 pounds of soybean oil with 218 lbs. of 91% isopropanol at 55° C. in the presence of nitrogen gas. Thereafter, the solvent-oil mixture was stirred at 50° C. for 15 minutes and then cooled rapidly to 23° C. It was withdrawn from the treatment kettle and then placed in the low temperature refrigerator at −25° C. for 2½ days. Thereafter, the supernatant liquid was decanted and the solid portion reextracted with 206 lbs. of 91% isopropanol in a manner similar to the first extraction. The two extracts were combined and the solvent removed under a vacuum and in the presence of nitrogen gas to form the antioxidant concentrate.

The results of the treatment of the crude shark liver oil with methanol in the presence of the aforementioned antioxidant concentrate were substantially better than that resulting from the procedure of Example I. Thus, the combined extracts weighed 21.6 grams having a specific vitamin A value of 53,700 units of vitamin A per gram. The residue consisted of 276.6 grams having a vitamin A value of 31,800 U. S. P. units of vitamin A per gram. The total oil yield was 99.4% of the original oil, and the total vitamin A recovery was 100%.

Example III

Twenty-five grams of carbon-refined shark liver oil were extracted with 4-100 ml. portions of methanol at −16° C. in precisely the same manner as described in Example I. The following results were obtained:

|  | Grams |
|---|---|
| Combined extract yield | 2 |
| Residue yield | 22.1 |

The specific vitamin A value of the extract was 66,500 U. S. P. units of vitamin A per gram. The specific A value of the residue was 47,200 U. S. P. units of vitamin A per gram. The total oil yield as compared to the original sample was 96.4%, and the A yield was 87.2%.

Example IV

The experiment of Example III was repeated, except that 5% by weight of soybean antioxidant concentrate prepared as described in Example II was added to the carbon-refined shark liver oil. The following results were obtained:

|  | Grams |
|---|---|
| Extract yield | 2.4 |
| Residue yield | 21.3 |

The specific A value of the extract was 56,000 U. S. P. units of vitamin A per gram, and the specific A value of the ester was 52,000 U. S. P. units of vitamin A per gram. The total oil yield as compared to the original was 94.8% and the total A yield 100%.

Example V

Twenty-five grams of carbon-refined halibut liver oil having a vitamin A value of 88,700 U. S. P. units of vitamin A per gram were extracted with 4-100 ml. portions of methanol at −16° C. in the manner set forth in the previous examples. The extracts yielded 1.6 grams of oil, and the residue 23.1 grams. The specific vitamin A value of the extracts was 142,000 U. S. P. units per gram, and the specific vitamin A value of the residue was 68,000 U. S. P. units per gram. The total oil yield was therefore 98.8% of the original, and the total vitamin A yield 82%.

Example VI

The experiment of Example V was repeated, except that 5% of soybean antioxidant prepared as described in Example II was added to the oil prior to extraction. The following results were obtained:

|  | Grams |
|---|---|
| Combined extract yield | 2.05 |
| Residue yield | 22 |

Specific vitamin A value of the extract was 127,000 U. S. P. units per gram, and the specific vitamin A value of the residue was 80,000 U. S. P. units per gram. The total oil yield was 96.2% of the original, and the total A yield 97.8%.

It is to be noted that in each of the above cases, the extract fractions consisted substantially of vitamin A alcohol, and the residue fractions of vitamin A ester. In the case of the carbon-refined fish liver oil, the extract fraction was singularly free from taste and odor.

It is also to be noted that the present process serves as a method for removing objectionable taste and odor constituents from the ester residues. In other words, where an oil which has not been previously refined to the extent that objectionable taste and odor have been removed is being fractionated, the taste and odor constituents are in general soluble in the polar solvents used for fractionation. There is produced, therefore, from the practice of the present invention a residue which consists of substantially all of the more stable and more desirable vitamin ester and which has been substantially freed from objectionable taste and odor. Although, as previously pointed out, it is preferred to use antioxidant concentrates produced by solvent extraction of various types of vegetable materials, other well-known antioxidants may be used. Such antioxidants may include phosphatides in combination with compounds which exert a synergistic action with the phosphatides. Such compounds include cyclic oxy types of compounds as, for example, quinones, hydroquinones, naphthoquinones, naphthols, naphtho-hydroquinones, chromans, chromenes, coumarones and coumarans. These latter compounds are, of course, antioxidants by themselves and may be used in the proportions hereinbefore set forth, either alone or in combination with phosphatides. Typical examples of such compounds are the alpha-beta-gamma tocopherols, the chroman 5-6 quinones and their precursors which are associated with vitamin E.

As will be noted, the present invention is particularly applicable to vitamin-containing marine oils. The vitamins contained in these oils are predominantly vitamin A, and a lesser proportion of vitamin D. It is therefore desired to point out that when in the claims a "vitamin-containing marine oil" is referred to, it is intended to include all the various types of oils of marine origin and the vitamins, i. e. A and D, normally occurring therein.

Having described my invention, what I claim as new and desire to secure by Letters Patent is:

1. A process of separating vitamin alcohols from vitamin esters, which comprises mixing a vitamin-containing marine oil containing fat-soluble vitamin alcohols and esters with a highly polar selective solvent which is characterized by being miscible with vitamin alcohols but immiscible with vitamin esters in the presence of an antioxidant concentrate obtained by the extraction of a natural antioxidant-containing fatty material of vegetable origin with a normally liquid polar organic solvent, the antioxidant being added to the marine oil not later than the solvent, thereafter allowing the mixture to stand to separate into a solvent layer containing a relatively large proportion of the vitamin alcohols originally present in said marine oil and a part of the antioxidant concentrate and a residual layer containing a major portion of the marine oil, a relatively large proportion of the vitamin esters originally present therein and a part of the antioxidant concentrate and separating the solvent layer from the residual layer, the antioxidant concentrate serving to inhibit the loss of vitamin potency through oxidation during the process as well as serving to stabilize the vitamin potency in the alcohol concentrate and the vitamin ester-containing marine oil.

2. A process of separating vitamin alcohols from vitamin esters, which comprises mixing a vitamin-containing marine oil containing fat-soluble vitamin alcohols and esters with methanol in the presence of an antioxidant concentrate obtained by the extraction of a natural antioxidant-containing fatty material of vegetable origin with a normally liquid polar organic solvent, the antioxidant being added to the marine oil not later than the methanol, thereafter allowing the mixture to stand to separate into a methanol layer containing a relatively large proportion of the vitamin alcohols originally present in said marine oil and a part of the antioxidant concentrate and a residual layer containing a major portion of the marine oil, a relatively large proportion of the vitamin esters originally present therein and a part of the antioxidant concentrate and separating the methanol layer from the residual layer, the antioxidant concentrate serving to inhibit the loss of vitamin potency through oxidation during the process as well as serving to stabilize the vitamin potency in the alcohol concentrate and the vitamin ester-containing marine oil.

3. A process of separating vitamin alcohols from vitamin esters, which comprises mixing a vitamin-containing marine oil containing fat-soluble vitamin alcohols and esters with ethanol in the presence of an antioxidant concentrate obtained by the extraction of a natural antioxidant-containing fatty material of vegetable origin with a normally liquid polar organic solvent, the antioxidant being added to the marine oil not later than the ethanol, thereafter allowing the mixture to stand to separate into an ethanol layer containing a relatively large proportion of the vitamin alcohols originally present in said marine oil and a part of the antioxidant concentrate and a residual layer containing a major portion of the marine oil, a relatively large proportion of the vitamin esters originally present therein and a part of the antioxidant concentrate and separating the ethanol layer from the residual layer, the antioxidant concentrate serving to inhibit the loss of vitamin potency through oxidation during the process as well as serving to stabilize the vitamin potency in the alcohol concentrate and the vitamin ester-containing marine oil.

LORAN O. BUXTON.

REFERENCES CITED

The following references are of record in the file of this patent:

UNITED STATES PATENTS

| Number | Name | Date |
| --- | --- | --- |
| 2,347,460 | Buxton | Apr. 25, 1944 |
| 2,282,795 | Musher | May 12, 1942 |
| 2,282,812 | Musher | May 12, 1942 |
| 2,345,576 | Buxton | Apr. 4, 1944 |
| 2,345,578 | Buxton | Apr. 4, 1944 |
| 2,248,619 | Freedman et al. | July 8, 1941 |
| 1,983,654 | Black | Dec. 11, 1934 |
| 2,221,692 | Hickman | Nov. 12, 1940 |
| 2,327,766 | Cawley | Aug. 24, 1943 |
| 2,389,955 | Buxton | Nov. 27, 1945 |